Aug. 29, 1944.                M. H. GRAHAM                2,356,784
                               COFFEE POT
              Filed April 7, 1942           4 Sheets-Sheet 1

Inventor
MAURICE H. GRAHAM,

By Edmund H. Pringle
   Stickney

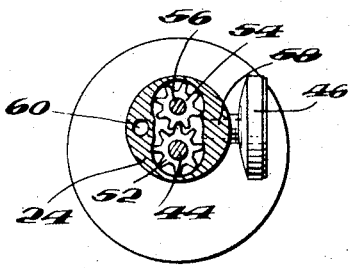
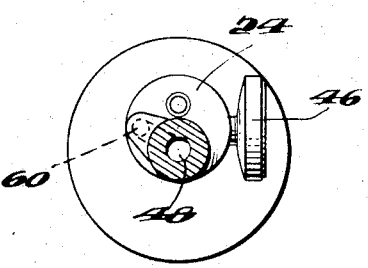
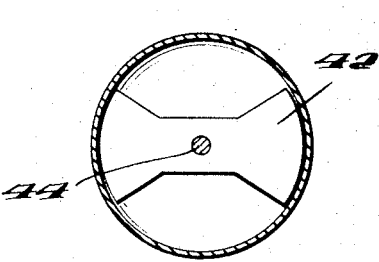
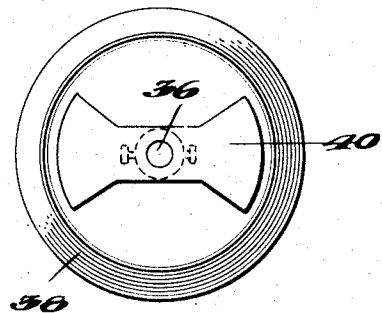
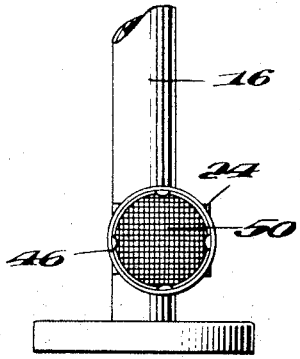
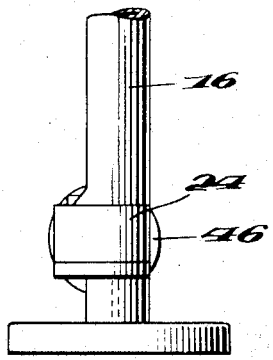

Aug. 29, 1944. M. H. GRAHAM 2,356,784
COFFEE POT
Filed April 7, 1942 4 Sheets-Sheet 4
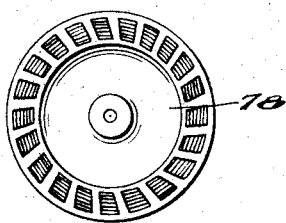
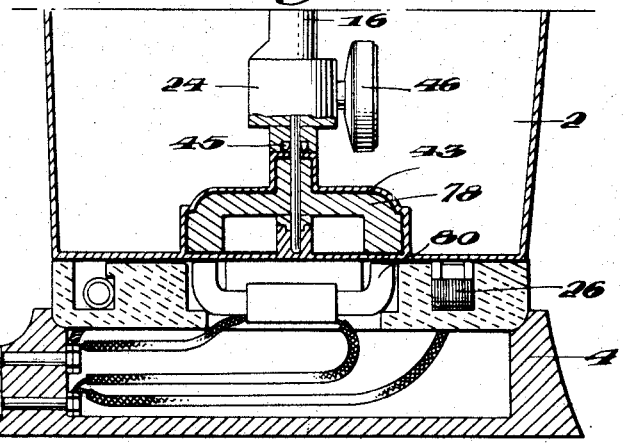
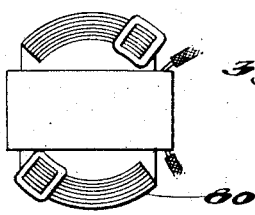
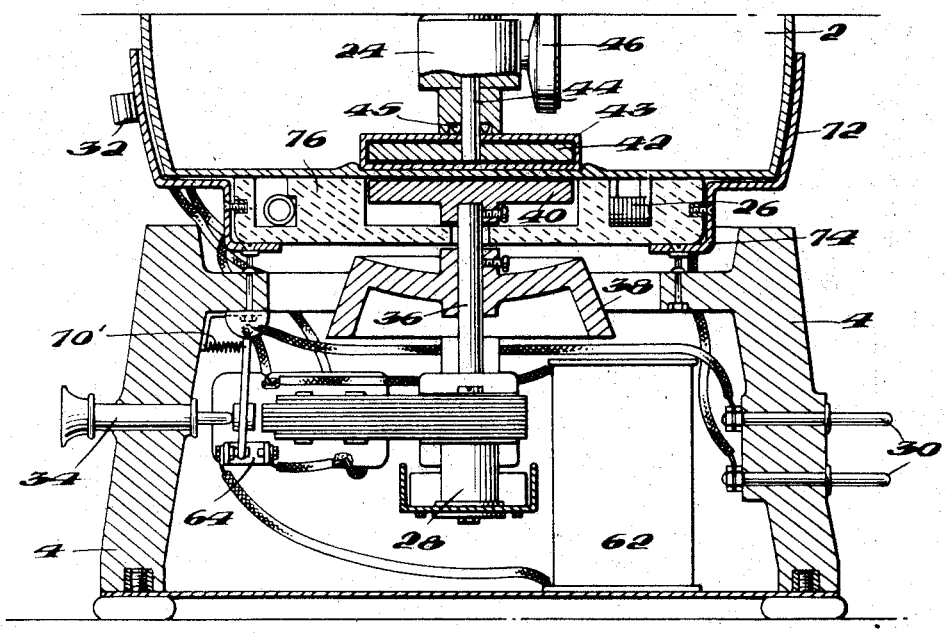
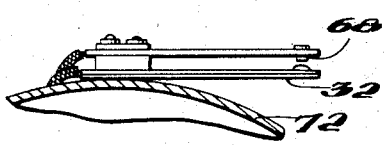
Inventor
MAURICE H. GRAHAM,
By Edmund H. Parry Jr.
Attorney Patented Aug. 29, 1944

UNITED STATES PATENT OFFICE 2,356,784

COFFEE POT

Maurice H. Graham, Minneapolis, Minn.

Application April 7, 1942, Serial No. 438,029

30 Claims. (Cl. 219—43)

This invention relates to cooking vessels of the type incorporating power-driven circulating mechanism, and in its primary application is concerned with coffee pots wherein the liquid is circulated for infusion by coffee grounds.

The primary object of the invention is to provide a cooking vessel with a circulating mechanism and with actuating means for the circulator devoid of physical driving connection with the circulator.

It is a further more specific object of the invention to provide a cooking pot, and in particular a coffee pot, with a circulating pump disposed interiorally thereof, and to drive the pump by actuating means located exteriorally of the pot without the necessity of extending a shaft or other driving device between the interior and exterior of the pot.

It is another object of the invention to provide a cooking pot and an associated stove or other mounting unit wherein a circulating pump disposed in the pot is actuated without the aid of a physical drive by actuating means mounted in the associated unit. In some embodiments of the invention the associated unit will be permanently secured to the pot. In other embodiments the pot will be removable from the associated unit. The invention has special utility for such latter arrangement since the lack of physical connection between the actuating means and pump facilitates the application of the pot to, and the removal of the same from, the associated unit containing the pump motor. Further, the pot may be handled, also cleaned, with greater ease by virtue of the fact that bulk and weight of the motor do not encumber the pot.

It is a further object of the invention to provide a cooking pot and in particular a coffee pot, having a circulating pump therein actuated by exteriorally located actuating means without the aid of a physical drive, with suitable control means for starting and stopping operation of the pump. The control means as well as the actuating means may be housed in a stove or other mounting which may be detachably associated with the pot or permanently secured thereto.

Still another object of the invention is to automatically terminate operation of a circulating pump in a cooking pot, and particularly in a coffee pot at the end of a cooking period through control mechanism disposed exteriorally of the pot, and free from physical operating connection with the pump.

A further object of the invention is to operate a circulating mechanism in a cooking vessel, and particularly in a coffee pot, from actuating means through a magnetic coupling.

It is well known that with coffee pots of the percolator type, the coffee holder and the fountain tube which supports it within the pot, are constructed and arranged for ready removal at the completion of the coffee making so that they and the pot may be cleaned. This highly important feature, however, imposes great restrictions and limitations on any attempt to provide pump means within the pot for continuously passing liquid from the bottom of the pot up through the fountain tube and then over the coffee grounds in the basket during the coffee making. Such limitations and restrictions are multiplied when it is attempted to drive such pump means by an electrical motor disposed either entirely within the pot or connected to the pump means by a shaft extending through a wall of the pot.

The problem of overcoming such limitations and restrictions may be satisfactorily solved by the present invention. In accordance therewith magnetically actuatable pump means is provided to circulate liquid in the cooking pot, and actuating means is mounted exteriorly of the pot to operate the pump means through a magnetic drive coupling which dispenses with the necessity of a physical driving connection between the actuating and actuated parts. In a preferred adaptation of the invention in such form of apparatus means for setting up a rotary magnetic field is mounted exteriorally of the device, preferably beneath the bottom of the coffee pot proper, and is adapted to rotate a magnetically responsive member disposed within the coffee pot proper, preferably at the base of the fountain tube. This is suitably connected with the pump to drive the latter.

In some forms of the invention the magnetically responsive pump driving means located within the pot comprises the driven half of a magnetic coupling and will be driven by actuating means comprising a motor-driven magnet coupling half located exteriorly of the pot. In other embodiments of the invention the magnetically responsive pump driving means located within the pot will comprise the rotor of an electromagnetic motor, and the actuating means located exteriorly of the pot will be stationary and comprise the stator of the motor.

Other objects of the invention and the manifold advantages possessed by structures made in accordance therewith will be readily apparent from the following description and claims when read in conjunction with the accompanying drawings, in which:

Figure 1 is a vertical section of a coffee percolator according to one embodiment of the invention.

Figure 2 is a view on the line 2—2 of Figure 1.
Figure 3 is a view on the line 3—3 of Figure 1.
Figure 4 is a view on the line 4—4 of Figure 1.
Figure 5 is a view on the line 5—5 of Figure 1.
Figure 6 is a side elevation of the pump structure.

Figure 7 is a side elevation of the pump structure showing the opposite side.

Figure 12 is a vertical section of a part of a second embodiment.

Figure 13 is a detail view of the thermostat used in the embodiment of Figure 12.

Figure 14 is a vertical section of the lower portion of a third embodiment.

Fig. 15 is a top plan view of the stator of the motor used in the embodiment of Fig. 14 and including a shaded pole magnet and field coil.

Fig. 16 is a bottom plan view of the rotor of the motor used in the embodiment of Fig. 14.

It should already be manifest that the invention contemplates driving of a pump disposed exteriorly of the pot, through the medium of a magnetic coupling. In such an arrangement, the actuating parts of the magnetic coupling are disposed exteriorly of the pot, while the driver element of the coupling is mounted within the pot in a position to be rotated by the magnetic forces set up by the actuating parts and consequently to actuate the pump to which it is operatively connected.

Figure 1:
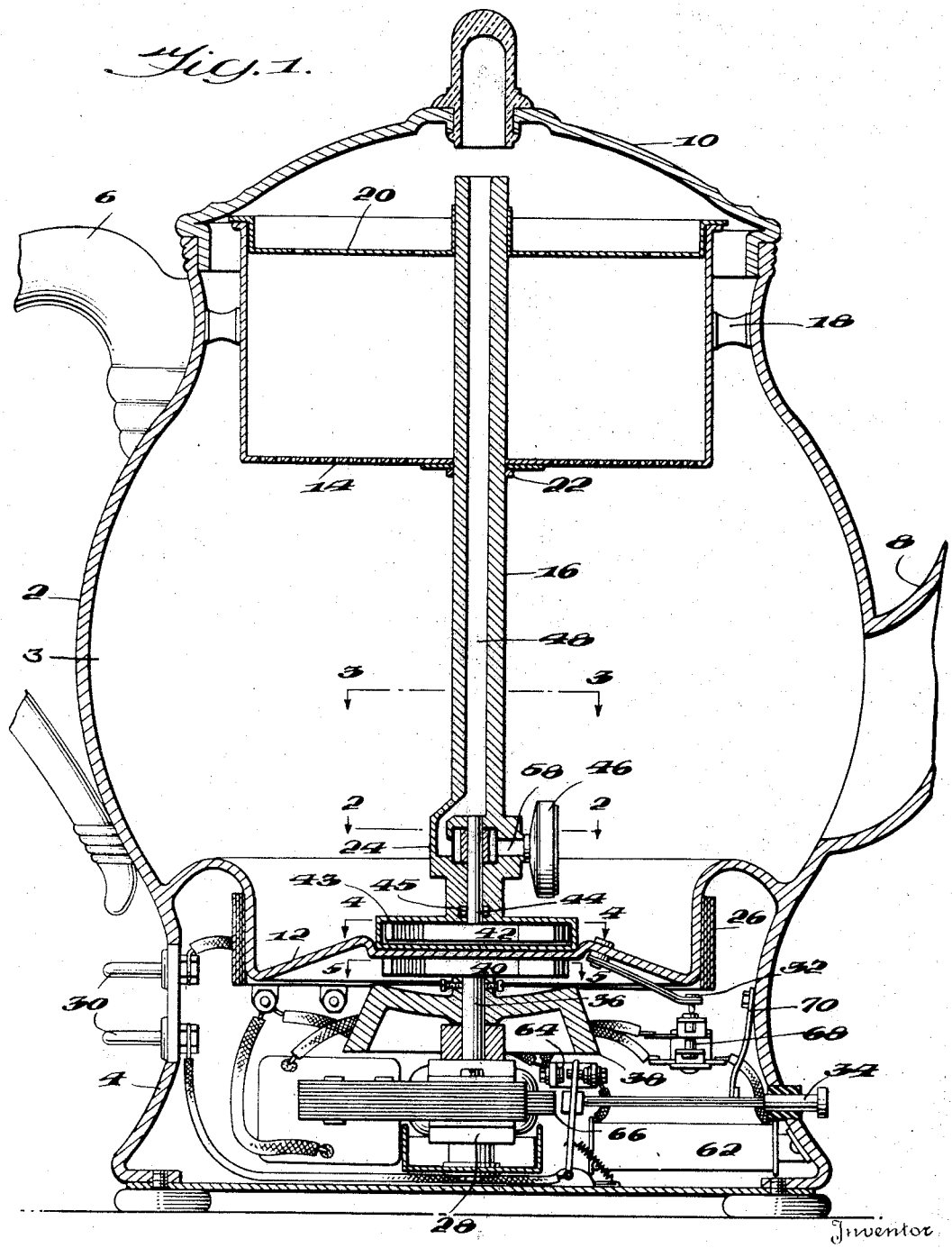

In one preferred embodiment of the invention illustrated in Figure 1, the device is comprised generally of a coffee-pot portion 2, housing a liquid chamber 3, and a stove portion 4. The coffee-pot portion is provided with the usual handle 6, spout 8, and cover 10.

In this embodiment of the invention the coffee-pot portion 2 and stove portion 4 are made integrally, but are partitioned by the bottom 12 of the coffee-pot portion. Disposed within the coffee-pot portion is a percolator unit which includes a coffee basket 14, of the usual type, and a fountain tube 16. The coffee basket 14 is provided with peripherally disposed studs 18 to position the coffee basket centrally within the coffee-pot portion 2. As is customary, the coffee basket is provided with a perforated cover 20, which, like the bottom of the coffee basket, is provided with a central opening to enable the coffee basket to be supported on the fountain tube, where it is held in the upper part of the coffee-pot portion 2 by means of a flange 22 on the fountain tube.

The lower end of the fountain tube 16 is provided with a small pump, indicated generally by the reference numeral 24, located in the liquid chamber 3. The bottom 12 of the coffee-pot portion is provided with a circular depression which is adapted to receive the lower end of the percolator unit and consequently to retain the same in centrally disposed position when the percolator unit has been lowered into the coffee-pot portion.

The stove portion 4 includes a heating element 26 disposed about the lower end of the coffee-pot portion 2. Also within the stove portion is a small electric motor 28, electric contact studs 30, a thermostatic element 32 and an operating switch 34. The driven shaft 36 of the motor 28 extends upwardly and has mounted thereon a balance wheel 38. Above the balance wheel 38 and secured to the shaft 36 to rotate therewith is a magnetized bar or member 40. This magnetized bar is disposed directly below a magnetically responsive member in the form of a similar magnetized bar 42 which is mounted for rotary movement within a housing 43 disposed beneath the pump unit 24 within the coffee-pot portion 2. It will be noted that the magnetized bars 40 and 42 are disposed in slightly spaced relation on opposite sides of the bottom 12 of the coffee-pot portion. The two bars are free of any positive driving connection and are coupled magnetically.

While the operation of the device will be explained more fully hereinafter, generally, the electric motor 28 when energized, rotates the magnetized bar 40, which in turn through the magnetic coupling causes rotation of the magnetized bar 42. This causes rotation of the driven shaft 44 which operates a small gear pump disposed within the pump unit 24. Suitable inlet means 46 are provided for the pump so that liquid in the bottom part of chamber 12 of the coffee-pot portion is pumped upwardly through the fountain tube, from the upper end of which it is dispersed to descend through and be infused by the coffee in the coffee basket and circulate back to chamber 12.

Figures 4 and 5 are views respectively on the lines 4—4 and 5—5 of Figure 1, and show one form for the bars 40 and 42.

Figures 2 and 3 are views on the lines 2—2 and 3—3 respectively of Figure 1. Figure 2 shows one form of rotary pump, while Figure 3 shows, in dotted lines, the passage from the pump to the central passageway 48 of the fountain tube.

Figures 6 and 7 show views of the pump unit. Figure 6 in particular shows the screen 50 for liquid inlet opening 46.

Pumping action in the pump unit 24 is effected by the rotation of two meshed gear pump wheels 52 and 54, the first of which is mounted on the shaft 44, whose upper end is journalled in the pump casing, and the second of which is mounted on a shaft 56, suitably journalled at both ends in the pump casing unit. Liquid is adapted to reach the pump through the inlet opening 46 and the connecting passage 58. Liquid expelled by the pump enters the passage 60 which extends upwardly and inwardly, as indicated in dotted lines in Figure 3, and which connects with the central passage 48 of the fountain tube.

When the air within the housing 43 becomes heated by the coffee infused liquid it will tend to expand and escape by way of the fitting between the shaft 44 and its bearing, and, conversely, when cooled, there will be a tendency for the resulting vacuum in the housing 43 to draw water back from the gear pump into the housing 43 through the space between shaft 44 and its bearing. In order to prevent this a projecting member 45 is provided which will permit the heated air to escape but will not allow the water to be drawn back into the housing 43.

In the embodiment described, a spring-pressed operating button switch 34 is adapted to initiate the heating action. This will be more readily apparent from the circuits indicated in Figures 8, 9, 10 and 11, when viewed in conjunction with Figure 1.

Figure 8:
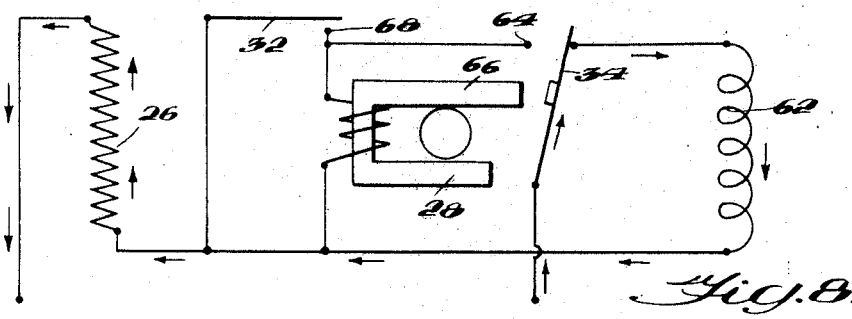
Figures 8 to 11 are diagrammatic views of the electrical circuit.
Figure 9:
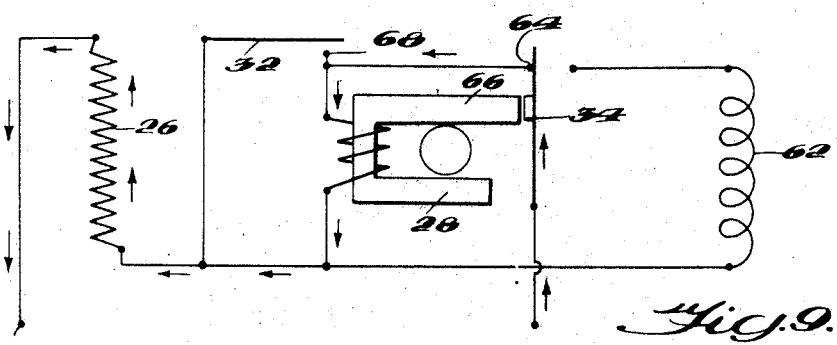

In Figure 8 the switch 34 is shown at rest position, when the current, flowing in the direction indicated by the arrows, will pass through the heavy resistance 62, whereby little heat will result at the heater element coil 26. By closing the switch 34 at 64, by pressing in its operating button (Figure 1) the resistance 62 is disconnected from the circuit and the motor 28 is cut into the circuit as shown in Figure 9, thereby causing operation of pump 24 to initiate circulation of the liquid for the coffee making operation. The electromagnet 66, here conveniently constituted by the field core of motor 28, then holds the switch 34 in closed position, as shown in Figure 9.

Figure 10:
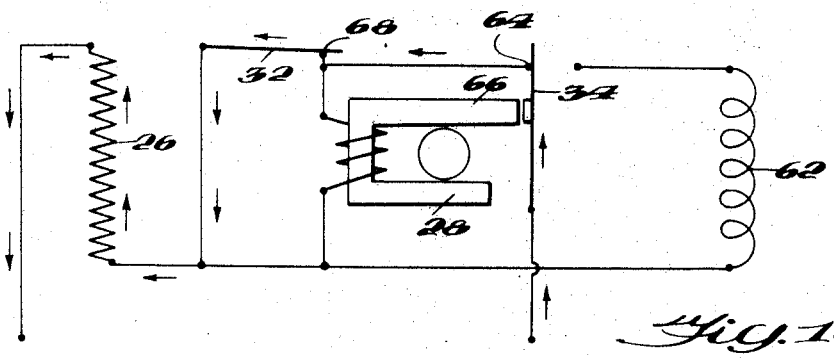
Figure 11:
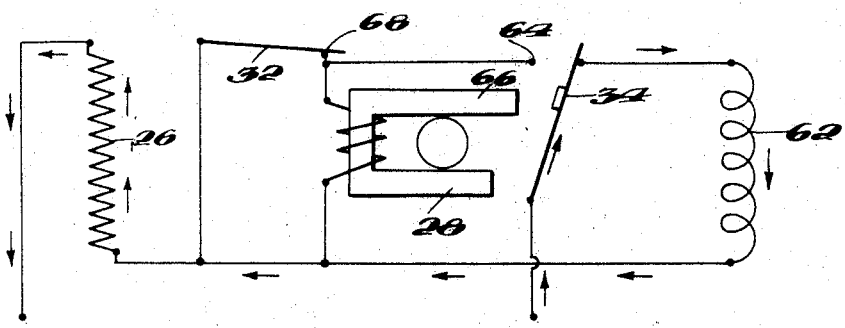

Since the motor affords little resistance as compared to resistance 62, the temperature of the heating element 26 rises. When after a time period, during which the coffee making operation is carried out, the heating element 26 reaches a predetermined temperature, the thermostatic element 32 (which may be a bimetallic element) closes the contact at 68 so as to shunt the motor 28 out of the circuit as indicated in Figure 10, thereby causing the pump 24 to stop and thus terminating the coffee making operations. At this time the core 66 of the motor becomes demagnetized and releases switch 34, which under tension of the spring 70 (Figure 1), will return the same to its original position and cut into the circuit the resistance 62, as shown in Figure 11. When the resistance 62 is cut into the circuit the temperature of the heating circuit 26 decreases to its previous temperature, which is sufficient to keep the coffee infusion at proper temperature for use. With the drop in temperature of the heater, the thermostatic element 32 returns to the position shown in Figure 8, and while this opens contact 68 through which the motor was shorted out of the circuit the motor will not resume operation since contact 64 was opened with the release of switch 34 as in Figure 10. The device is ready for a new cooking operation.

A modification of the invention is illustrated in Figures 12 and 13. In such modification the coffee-pot portion 2, which as before houses pump 24 and magnetic bar 42, is separable from the stove portion 4, which is stationary. The heating element 26, motor 28, magnetic bar 40, and all controls are housed in the stove, thus materially reducing the weight of the coffee-pot portion and making the pot easier to manipulate in pouring coffee. The stove portion 4 is comprised of a suitable framework or support and the upper part thereof is provided with an annular shaped coffee-pot receiving member 72 shaped to removably receive the bottom of the coffee-pot portion 2. The receiving member 72 is provided with an annular L-shaped flange 74 which supports a block 76 of refractory material or the like and in which is disposed the heating element 26. The block 76 is formed with a central cutout to provide room for the magnetized bar 40 which is adapted to rotate therein. In this embodiment the thermostatic element 32 may be mounted on the receiving member 72 as shown in detail in Figure 13. Other minor changes in construction may also be effected, such as, for example, the use of a coil spring 70' for the push button switch 34 in lieu of the leaf spring 70 of the embodiment of Figure 1.

Aside from the differences enumerated, the embodiment just described is generally the same as that disclosed in Figures 1 to 11 inclusive, and operates in substantially the same manner.

A third form of the invention is shown in Figures 14, 15 and 16. In this embodiment a shaded pole electromagnetic motor is utilized with the rotor 78 thereof rotatably mounted in the coffee-pot portion 2 and actuated by the stationary magnetic motor stator 80 fixedly mounted in the stove portion 4. There is no timer shown as being employed in this embodiment, but such means could be employed if so desired. Figures 15 and 16 are plan views of the motor stator and rotor respectively. In accordance with this embodiment the coffee-pot portion 2 and the stove portion 4 are separable as in the embodiment of Figure 12 but could be made integral if desired as in the embodiment of Figure 1. Obviously, alternating current is required to operate this embodiment.

Whatever be the particular embodiment that is chosen, it will be apparent that liquid circulating cooking pots operated by a motor driven pump, and particularly coffee makers, constructed in accordance with the invention possess many advantages. In a general manner, while, what are deemed to be practical and efficient embodiments have been described, changes in arrangement, disposition and form of the parts may be made without departing from the principle of the invention.

I claim:

1. In a cooking pot adapted to contain liquid, magnetically actuatable pump means in the pot operative in response to a rotary magnetic field, and means disposed exteriorly of the pot setting up a rotary magnetic field acting on said pump means.

2. In combination, a cooking pot, magnetically responsive pump means within the pot for circulating liquid therein, and driving means disposed outside the pot, and separated from the magnetically responsive pump means by an imperforate wall portion of the pot, magnetically drive-coupled to said pump means.

3. In a cooking pot adapted to contain liquid, pump means within the pot for circulating the pot liquid, magnetically driven rotary means within the pot for actuating the pump means, mounting means in the pot supporting the pump means and said magnetically driven rotary means in the lower portion of the pot below the normal liquid level therein and supporting said magnetically driven rotary means adjacent the lower pot portion wall, and magnetic means located exteriorly of the pot and below the normal liquid level therein operative to set up a magnetic field within the lower portion of the pot adapted to drive the magnetically responsive pump operating rotary means.

4. In combination, a coffee pot, coffee holder in said pot, magnetically responsive pump means within said pot for circulating infusing liquid through coffee in said holder, and magnetic means outside the pot for actuating said magnetically responsive circulating means and magnetically drive-coupled thereto.

5. A cooking pot assembly comprising a stove portion and a pot portion in operative relation with said stove portion, magnetically responsive means within the pot for circulating liquid therein, and magnetic means outside the pot and mounted in the stove means for actuating the magnetically responsive circulating means.

6. In combination, a cooking pot, magnetically responsive pump means for circulating liquid therein, and a motor disposed outside the pot magnetically drive-coupled to said magnetically responsive pump means.

7. In a cooking pot adapted to contain liquid having interiorly disposed tube means adapted to convey liquid from the lower part of the pot to the upper part, pump means within the pot for circulating the pot liquid, and connecting with said tube means, driving means disposed exteriorly of the pot, and a magnetic coupling having complementary portions respectively disposed exteriorly and interiorly of a wall of the 8. In a cooking pot adapted to contain liquid having interiorly disposed tube means adapted to convey liquid from the lower part of the pot to the upper part, pump means within the pot for circulating the pot liquid, and connecting with said tube means, driving means disposed exteriorly of the pot, and a magnetic coupling having complementary portions respectively disposed exteriorly and interiorly of a wall of the pot, means operatively connecting said exteriorly disposed portion to said driving means, and means operatively connecting said interiorly disposed portion to said pump means.

9. In a coffee pot of the percolator type having an upright fountain tube, pump means disposed within the pot and communicating with said fountain tube, an electric motor disposed exteriorly of the pot, and a magnetic coupling having complementary elements respectively disposed interiorly and exteriorly of a wall of the pot and operatively connecting said electric motor and said pump means.

10. In a coffee pot, a coffee holder for said pot, a pump within the pot for circulating infusing liquid through coffee in said holder, magnetically responsive means for driving the pump mounted for rotary movement within the pot and adjacent one wall thereof, a magnetized member mounted for rotation exteriorly of the pot and positioned so that its magnetic field will rotate said magnetically responsive means, and means exteriorly of the pot for rotating said magnetized member.

11. In a coffee pot, an upright fountain tube, pump means including at least one rotatable element carried by said fountain tube, said pump means being positioned near the lower end thereof and connecting with said tube to force liquid upwardly therethrough when actuated, a bar mounted for rotary movement within the pot and adjacent one wall thereof, means connecting said bar with the rotatable element of said pump means, a magnetized bar mounted for rotation exteriorly of said pot and positioned so that its magnetic field includes said first bar, and means exteriorly of the pot for rotating said magnetized bar.

12. In a coffee pot, a fountain tube for circulating infusing liquid removably mounted in the pot, a circulating pump in fluid communication with the fountain tube, said pump being secured to the fountain tube for removal therewith from the pot, magnetic actuating means located outside the pot for operating the pump mounted independently of, and free of physical connection with the pump means and the fountain tube, and magnetically responsive means within the pot secured to the removable fountain tube and actuatable by the magnetic means outside the pot to drive the pump.

13. In a coffee pot, a fountain tube, pump means including at least one rotatable element carried by said fountain tube, said pump means being positioned near the lower end of said tube and connecting therewith to force liquid upwardly therethrough when the pump is actuated, a magnetically responsive member mounted for rotary movement within the pot and adjacent one wall thereof, means operatively connecting said member with the rotatable element of said pump means, magnetized means mounted for rotation exteriorly of said pot and positioned so that its magnetic field includes said magnetically responsive means, an electric motor disposed exteriorly of the pot, said magnetized means being mounted on the shaft of said motor to rotate therewith.

14. In a coffee pot, a coffee holder for said pot, pump means within the pot for circulating infusing liquid through the coffee holder, magnetically responsive means mounted for rotary movement within the pot and adjacent one wall thereof, means connecting said magnetically responsive means with the said pump means, magnetic means mounted for rotation exteriorly of said pot and positioned so that its magnetic field includes said magnetically responsive means, an electric motor disposed exteriorly of the pot, said magnetic means being mounted on the shaft of said motor to rotate therewith, and a balance wheel mounted on the motor shaft between the motor and the magnetic means.

15. In a coffee pot, pump means disposed within the pot for circulating infusing liquid therein, and electromagnetic motor pump actuating means comprising a motor rotor disposed interiorly of the pot adjacent one wall thereof and being operatively connected to said pump means, and a motor stator disposed exteriorly of said wall adjacent thereto and being operative through the rotor to drive the pump means.

16. In a coffee pot, pump means disposed within the pot for circulating infusing liquid therein, and electromagnetic motor pump actuating means comprising a motor rotor disposed interiorly of the pot above and adjacent the bottom wall thereof, and being operatively connected to said pump means, and a motor stator underlying the rotor disposed exteriorly of the pot below said bottom wall and being operative to drive the rotor and pump means.

17. In a coffee pot, a liquid storage chamber, a coffee holder, and means for repeatedly cycling liquid through the coffee holder from and to the storage chamber including conduit means interconnecting the storage chamber and coffee holder, mechanical pump means disposed within the pot and operatively connected to said conduit means for circulating liquid therethrough, and electromagnetic motor means for driving the pump means comprising a motor rotor disposed within the pot and drive-connected to said pump means and a motor stator located exteriorly of the pot adapted to set up within the pot a magnetic field operative to drive said rotor and pump means.

18. In combination with a cooking pot having magnetically responsive circulating pump means therein, an auxiliary unit removably associated with the pot, power operated pump driving magnetic means in the removable auxiliary unit magnetically coupled with said pump means which is broken when the auxiliary unit is removed from the pot.

19. In combination with a coffee pot having a pump therein for circulating infusing liquid, a stove base unit removably supporting the pot, a pump driving magnetic means housed in the central portion of said base unit, an electric heating coil mounted in the base unit outwardly of said central portion, magnetically responsive means disposed within the lower central portion of the pot for operating the pump, said magnetically responsive means being actuatable by said magnetic means when the pot is operatively supported by said base.

20. Cooking apparatus comprising a stove, a cooking pot mounted in operative relation on the stove and being removable therefrom, magnetically responsive means carried by and mounted within the pot adapted to subject material introduced into the pot for a cooking operation to circulating movement, an actuator for driving said circulating means free from physical operative connection with the circulating means, thereby, to facilitate mounting of the pot on the stove and removal from the stove, said actuator including magnetic means carried by the stove adapted to drive said circulating means when the pot is mounted in operative relation on the stove.

21. In combination with a coffee pot mounting magnetically responsive pump means for circulating infusing liquid therein, a base removably supporting the pot, and pump driving magnetic means housed in said base adapted to make operative magnetic driving connection with said pump means when the pot is supported by said base.

22. In a coffee pot, pump means in the pot for circulating infusing liquid therein, a housed magnetically responsive member mounted within the pot for rotary movement within its housing adjacent one wall of the pot, means operatively connecting said member with said pump means, magnetized means mounted for rotation exteriorly of said pot and positioned so that its magnetic field extends through the housing of said magnetically responsive member and includes said magnetically responsive means, and means exteriorly of the pot for rotating said magnetized means, said magnetized means and said means for rotating the same being removable from the pot as a unit.

23. A coffee pot assembly comprising a stove portion, a pot portion adapted to be removably disposed in operative relation with respect to said stove portion, a fountain unit adapted to be removably disposed within said pot portion, said fountain unit comprising an upright fountain tube, a pump located in the pot, said pump having an inlet communicating with the pot, said pump having an outlet connecting with said fountain tube and through which liquid is forced upwardly when the pump is actuated, magnetically responsive means in the pot, means connecting said magnetically responsive means and the pump to actuate the latter when said magnetically responsive means is rotated, an electric motor mounted in said stove portion, and a magnetized member connected with said motor to be rotated thereby, said magnetized member being positioned so that its magnetic field extends to and includes the magnetically responsive means disposed within the pot portion when said pot portion is disposed on said stove portion.

24. A coffee pot assembly comprising a stove portion and a pot portion adapted to be removably disposed in operative relation with respect to said stove portion, a pump in the pot portion for circulating infusing liquid therein, magnetically responsive means in the pot portion, and means connecting the magnetically responsive means and the pump to actuate the latter when said magnetically responsive means is rotated, an electric motor mounted in said stove portion, and a magnetized member connected with said motor to be rotated thereby, said magnetized member being positioned so that its magnetic field extends to and includes said magnetically responsive member within the pot portion when said pot portion is operatively disposed on said stove portion, and positioning means for said pot and stove portions for assuring disposition of the magnetized and magnetically responsive members in operative relation.

25. A coffee pot having an integrally arranged pot portion and stove portion with the bottom of the pot portion serving as a partition between the two, a pump disposed within the pot portion for circulating infusing liquid therein, magnetically responsive means rotatably mounted interiorly of the bottom of the pot portion for driving the pump, an electric motor mounted in said stove portion, and magnetized means connected with said motor to be rotated thereby, said magnetized means being positioned so that its magnetic field extends to and includes the magnetically responsive means disposed within the pot portion.

26. In a cooking pot, a pump within the pot for circulating liquid therein, pump actuating means disposed exteriorly of the pot, means operatively connecting the pump with said actuating means, and thermostatic control means responsive to the temperature of the pot adapted to automatically terminate operation of the pump.

27. In a coffee pot, a pump within the pot for circulating liquid therein, magnetically driven means within the pot for operating the pump, magnetic actuating means disposed exteriorly of the pot operative through said interiorly disposed magnetic means to drive the pump, and thermostatic control means responsive to the temperature of the pot adapted to automatically terminate operation of the pump.

28. In a cooking pot, a pump within the pot for circulating liquid therein, a stove removably mounting the pot, pump actuating means in the stove magnetically coupled to the pump, and thermostatic control means mounted in the stove to be responsive to the temperature of the pot when the pot is mounted on the stove, said thermostatic means controlling operation of the pump.

29. In a cooking pot, a pump within the pot for circulating liquid therein, power-operated pump actuating means disposed exteriorly of the pot, means operatively connecting the actuating means with the pump, manually controlled means for energizing the actuating means to start operation of the pump, and thermostatic means responsive to the temperature of the pot adapted to terminate operation of the pump.

30. In a cooking pot, a pump within the pot for circulating liquid therein, electric heating means disposed exteriorly of the pot and adapted to heat the same, electric motor means disposed exteriorly of the pot, magnetic coupling means operatively connecting the motor means with the pump means, initiating means for starting the motor to initiate operation of the pump, and thermostatic control means responsive to the heating effect of said heating means adapted to terminate operation of the pump and its motor means.

MAURICE H. GRAHAM.